United States Patent [19]

Lomax et al.

[11] 4,075,666
[45] Feb. 21, 1978

[54] MAGNETIC TAPE RECORDER

[75] Inventors: John A. Lomax, Redwood City; William J. Martin, Sunnyvale, both of Calif.

[73] Assignee: Ampex Corporation, Redwood City, Calif.

[21] Appl. No.: 410,531

[22] Filed: Nov. 12, 1964

[51] Int. Cl.² .................. H04N 5/78; G11B 27/36
[52] U.S. Cl. .................................. 360/11; 360/31
[58] Field of Search .................. 178/6.6 A, DIG. 3; 360/11, 37

[56] References Cited

U.S. PATENT DOCUMENTS

| 2,921,124 | 1/1960 | Graham | 178/DIG. 3 |
| 3,152,223 | 10/1964 | Wessels | 178/6.6 A |
| 3,391,248 | 7/1968 | Hirota | 178/6.6 A |

Primary Examiner—Howard W. Britton

[57] ABSTRACT

An arrangement for slow-speed recording of video signals on magnetic tape. Long recording time capacity and economy of tape are achieved by a reduction of tape speed without a sacrifice of head-to-tape velocity. The arrangement is particularly applicable to various uses in the video and instrumentation fields where the quality of recording is not critical but long recording time capacity and tape economy are desirable attributes. Examples are the continuous televising of airport traffic control radar or the interiors of banks and retail establishments and other surveillance situations where video recording or periodic photography are practiced today. A simple arrangement of staggered heads is employed to accomplish the desired results.

13 Claims, 5 Drawing Figures

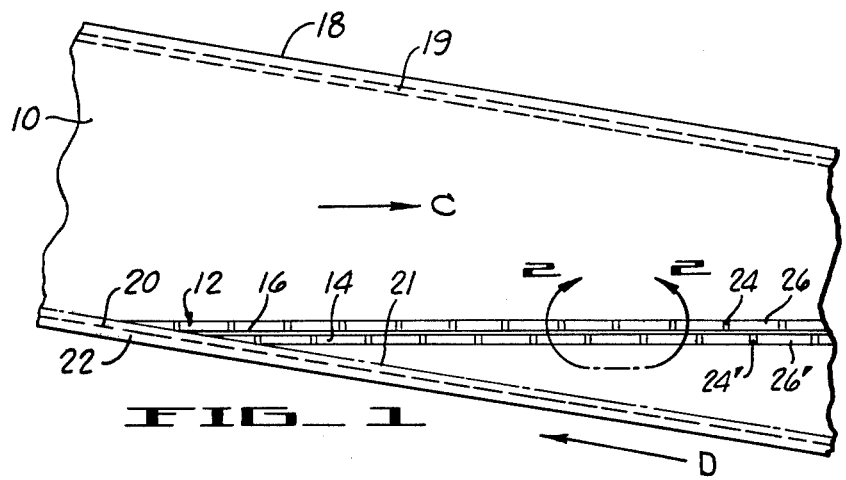
FIG_1
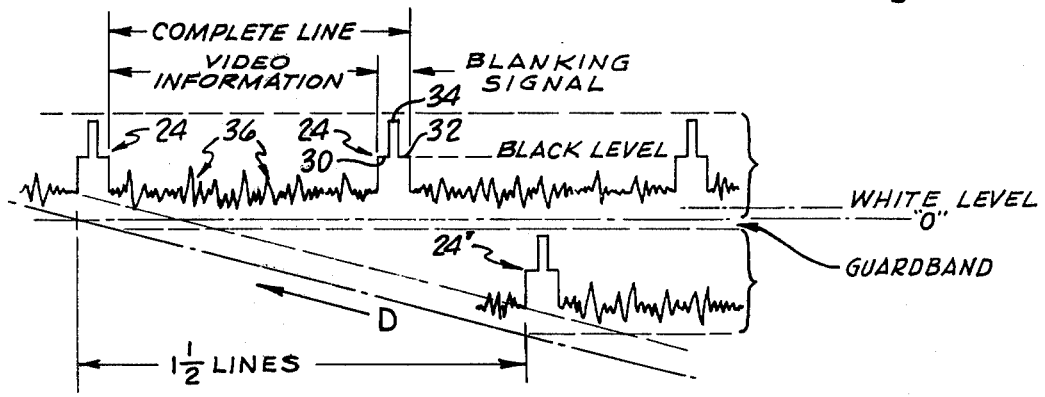
FIG_2
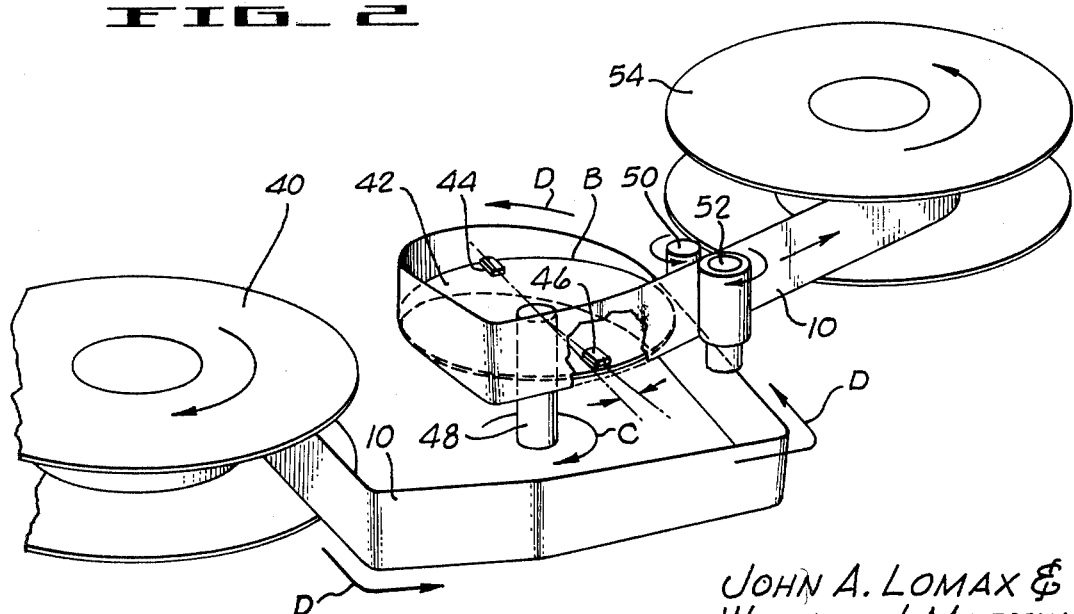
FIG_3
JOHN A. LOMAX &
WILLIAM J. MARTIN
INVENTORS
BY James H. Griffin
ATTORNEY

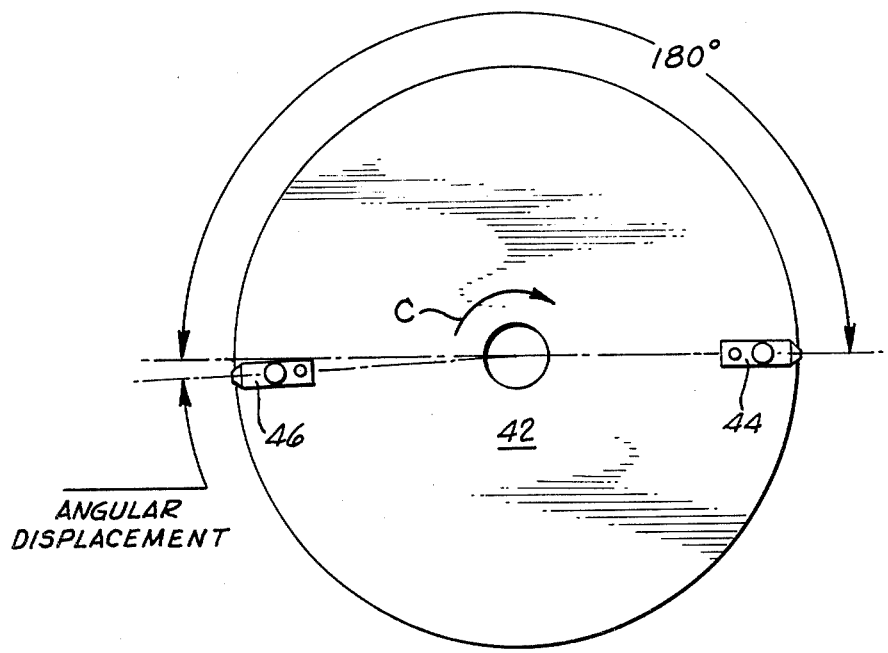
FIG_4
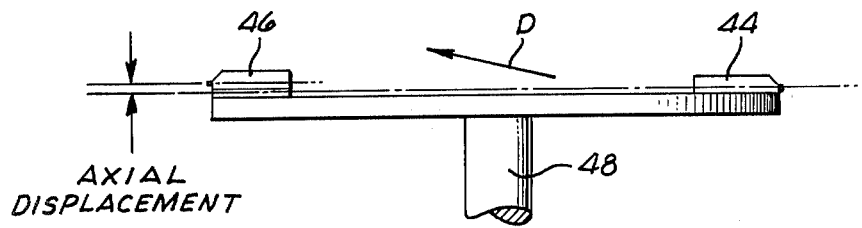
FIG_5

MAGNETIC TAPE RECORDER

This invention relates in general to magnetic tape recorders and more particularly to new developments in the arrangement of the heads thereof.

In the practice of magnetic tape recording in the television, instrumentation, and other fields, recording and playback are accomplished by the rotary head method — one or more heads are mounted on a head drum which rotates at some angle to the path of a moving magnetic tape. Mounted on the rotary head drum are one or more magnetic heads to which or from which there are switched electronically the electrical signals with which the tape recorder deals. Heretofore all the heads on one head drum have been mounted on one plane perpendicular to the axis of rotation of the head drum. Where plural heads were to be employed they were generally paired opposite each other along a line perpendicular to the axis of rotation of the head drum.

There are a number of applications in the video and instrumentation fields where the quality of the recording is not critical but where long recording time capacity and economy of tape would be valuable characteristics. Examples of these are the continuous televising of airport traffic control radar or the interiors of banks and retail establishments and other such surveillance situations where audio recording or periodic photography are practiced today. It would be desirable in such cases to record continuously on one roll of tape for the entire business day or for a similarly long period, then erase and reuse the tape the following day unless some emergency made it necessary to preserve the taped record. Heretofore the "slow-speed recording" required in such applications has been limited by the characteristics of the tape and by the amount of definition deemed necessary for an adequate video picture. Due mainly to the limitations imposed by the size of the oxide particles on magnetic tape, a head must pass over the tape at a certain minimum speed. Thus the velocity of peripheral rotation of currently used rotary head recorder head drums cannot be lowered below the minimum acceptable head-to-tape velocity of 640 ips. The tape itself must be moved past the rotating heads at least fast enough to move a newly recorded track out of the way before the next track in line is laid down; thus $3\frac{3}{4}$ ips is the minimum tape speed commonly found in rotary head recording. In the design of a slow speed rotary head magnetic tape recorder, two important variables are writing speed and track width as indicated above. The reduction of writing speed below a certain minimum reduces performance, especially the signal-to-noise ratio of the system.

It is, therefore, a general object of this invention to provide a slow speed magnetic tape recorder.

Another object of this invention is to provide a magnetic tape recorder with long recording time capacity and economy of tape.

Another object of this invention is to provide a slow speed magnetic tape recorder wherein the tape speed is reduced without the sacrifice of head-to-tape velocity.

In the achievement of the above and other objects and as a feature of applicants' invention, there is provided a slow speed rotary head magnetic tape recorder having heads so staggered that upon normal actuation of the head drum and tape each field (i.e., track or trace) on the tape is read twice, once by each head.

In the recording process, only one of the heads is used so that only one field of each frame of a television picture (only half the information in non-video systems) is recorded. In playback, this signal recorded field is read twice, once by a leading head and then again by a trailing head that is displaced both circumferentially and longitudinally on the head drum with regard to the leading head. The result is a recording system which runs at one half the tape speed otherwise possible while still operating at the same writing speed and track spacing as a standard machine. Since the picture display time remains the same, the slow speed recorder does not exhibit increased flicker; but the sacrifice of the second field in each frame does cause some increase in intermittent motion (i.e., jerkiness or movement of a smoothly moving subject).

Other objects and features of applicants' invention and a further understanding thereof may be had by referring to the following description and claims taken in conjunction with the accompanying drawings, in which:

FIG. 1 is a plan view of a short section of magnetic tape of a type to which applicants' invention relates;

FIG. 2 shows the nature and relationship of the signals on two adjacent tracks of the tape shown in FIG. 1;

FIG. 3 is a perspective view of a magnetic tape recorder tape drive and scan system in which the principles of applicants' invention are employed;

FIG. 4 is a plan view of a rotary head drum in which the principles of applicants' invention are employed; and FIG. 5 is a side elevation of the rotary head drum shown in FIG. 4.

Referring to FIG. 1, in the present practice of rotary head magnetic tape recording in the television field, a magnetic tape 10 has video tracks 12 and 14 with a guard band 16 therebetween. At the top of the tape is an audio track 18 with its associated guard band 19, while at the bottom of the tape appear a cue track 20, control track 22, and their associated guard bands 21 and 23, respectively. The video tracks 12 and 14 are shown with blanking signals 24 and 24', respectively, and information portions 26 and 26', respectively. The blanking portions 24 and 24' of each adjacent track are here shown 180° out of phase; actually, each successive track is delayed $1\frac{1}{2}$ television signal lines. However, such spacing arrangements may differ between various models of tape recorders. Referring to FIG. 2, it will be seen that the signals corresponding to the spaces 24 and 26 in FIG. 1 make up a complete line of video information. A blanking pulse 24 or 24' has a "front porch" 30, a "back porch" 32, and a horizontal sync pulse 34. The level of the front and back porches is the "black" level of the video signal, corresponding to about 75% modulation between the top of the horizontal sync pulse and zero. The "white" level of the video signal corresponds to about 20% modulation between zero and the top of the horizontal sync pulse. The actual video information appears in the signals shown generally at 36.

Referring to FIG. 3 it will be seen that a tape deck wherein the principles of applicants' invention are embodied has a supply reel 40 from which the tape 10 is guided in the direction shown by the arrows D around the periphery of the head drum 42, on which are mounted two heads 44 and 46. The head drum 42 is mounted on a head drum shaft 48 which is rotated in the direction shown by the arrow C by means not here shown. After being scanned by the heads 44 and 46, the tape 10 is drawn between the capstan 50 and the pinch roller 52 and then is wound onto a take-up reel 54. Referring to the plan view of the head-drum 42 in FIG. 4, it will be seen that the heads 44 and 46 are not mounted directly opposite from each other. Rather, the head 46 is displaced angularly from the 180° opposed position by a distance such that it will begin scanning a given track on the tape 10 just as the head 44 reaches the end of that same track. In the side elevation of the head drum 42 in FIG. 5, it will be seen that the heads 44 and 46 are not mounted in the same plane, rather the head is displaced from the head 44 by a distance in the axial direction (relative to the shaft 48) such that it will be substantially centered on the track when it commences its scan.

In the operation of the above-described slow-speed magnetic tape recorder, recording is performed by only one head, for example, the head 44, which would record first the track 12, then the track 14, as shown in FIGS. 1 and 2. On playback of such a tape, each track, 12 or 14, would be scanned twice, first along line B of FIG. 3 by the leading head 44 and immediately thereafter by the staggered head 46, which arrives at the beginning of the track just as the head 44 is leaving, when the track has moved approximately one-half a track spacing beyond the arrival point of the head 44. If, as shown by way of example in FIGS. 1 and 2, each successive track 12, 14 of the rotary-recorded television tape 10 begins 1¼ lines beyond the line before it, as illustrated by FIG. 2, dimension A, the combination of a three-fourths line displacement (i.e., half way between lines 12 and 14) of the tape and a three-fourths line staggering of the head 46 duplicates the time effect upon repeating a track already sensed by the head 44 that would occur if two directly opposed rotary heads were alternately scanning successive tracks, such as 12 and 14.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and the scope of the invention as hereinafter claimed.

What is claimed is:

1. A slow speed magnetic tape recorder having a rotary head drum, a first magnetic head mounted on the periphery of the head drum, a second magnetic head mounted on the periphery of the head drum and so positioned relative to said first magnetic head that it will re-scan the same track on a tape being played on the recorder that was previously scanned by the first magnetic head.

2. A slow speed magnetic tape recorder having a rotary head drum shaft, a rotary head drum mounted on the shaft, a first magnetic head mounted on the periphery of the head drum, a second magnetic head mounted on the periphery of the head drum and so positioned relative to said first magnetic head that it will re-scan the same track on a tape being played on the recorder that was previously scanned by the first magnetic head.

3. A rotary head magnetic tape recorder for the slow speed playback of signals recorded on a magnetic tape comprising: a rotary head drum mounted to scan the tape, means for rotating the head drum, a first magnetic head mounted on the head drum, a second magnetic head mounted on the head drum and so positioned that it will re-scan the same area on the tape as the first head under normal operating conditions of head drum rotation and tape speed and will re-transduce in proper time synchronization a track of recorded signal already transduced by the first head.

4. A rotary head magnetic tape recorder for the slow speed playback of standard television signals recorded on a magnetic tape comprising: a rotary head drum mounted in such position as to be able to scan the tape, means for rotating the head drum, a first magnetic head mounted on the periphery of the rotary head drum, a second magnetic head mounted on the periphery of the head drum and so positioned relative to the first magnetic head drum that it lies in a plane perpendicular to the axis of rotation of the rotary head drum that is displaced from the plane perpendicular to the axis of rotation in which the first head lies by a distance such that the second head will re-scan the same area on the tape as the first head under normal operating conditions of head drum rotation and tape speed, and that it also lies in a plane parallel to and including the axis of rotation of the head drum that is so displaced angularly from the plane parallel to and including the axis of the head drum in which the first head lies that it will re-transduce in proper time synchronization a track of standard television signal already transduced by the first head.

5. A rotary head magnetic tape recorder for the slow speed recording or playback of standard television signals in successive tracks on a magnetic tape comprising: a supply reel from which the tape is unwound during recording or playback, a takeup reel upon which the tape is wound during recording or playback, a rotary head drum shaft, a rotary head drum mounted on the rotary head drum shaft in such position as to be able to scan the tape being wound between the supply reel and the takeup reel, means for rotating the head drum, a first magnetic head mounted on the periphery of the rotary head drum, a second magnetic head mounted on the periphery of the head drum and so positioned relative to the first magnetic head that it lies in a plane perpendicular to the axis of rotation of the rotary head drum that is displaced from the plane perpendicular to the axis of rotation in which the first head lies by a distance such that the second head will scan the same area on the tape as the first head under normal operating conditions of head drum rotation and tape speed, and that it also lies in a plane parallel to and including the axis of rotation of the head drum that is so displaced angularly from the plane parallel to and including the axis of the head drum in which the first head lies that it will re-transduce a track of standard television signal already transduced by the first head with a displacement of one-half a line.

6. A system for recording and playing back a video signal comprising a rotary body, means for mounting a magnetic recording and reproducing head and a magnetic reproducing head on the periphery of said rotary body, a magnetic recording medium, means for moving said recording medium past said rotary body at a predetermined speed for recording said video signal in parallel oblique tracks on said medium, means for rotating said rotary body with a velocity relative to said speed such that a video signal of one field is recorded in one track on said medium, means for applying said video signal of alternate fields to said magnetic recording and reproducing head, no video signal being applied to said magnetic reproducing head during a recording process, means for locating said reproducing head at a position on said rotary body wherein said reproducing head traces the track recorded by said recording and reproducing head with a time lag of one field period, a first means comprising said recording and reproducing head for playing back said video signal of alternate fields, a second means comprising said reproducing head for playing back said video signal of alternate fields with a time lag of one field period, and means for sequentially interlacing the signal reproduced by said first means with the signal reproduced by said second means.

7. A system for recording and playing back a video signal as defined in claim 6 wherein said reproducing head is mounted at a position on the peripheral edge of said rotary body in a plane which is parallel to the plane in which the recording and reproducing head is mounted.

8. A system for recording and playing back a video signal as defined in claim 6 in which said reproducing head is mounted in a rotating plane and at a position on the peripheral edge of said rotary body which is a predetermined distance apart from the position of a rotating plane in which said recording and reproducing head is mounted, said reproducing head being another distance apart from a position diametrically opposite to said recording and reproducing head so that there is a minimum overlap of the video signal reproduced by said recording and reproducing head and the video signal reproduced by said reproducing head.

9. Apparatus for recording and reproducing a visual image signal comprising means for providing a series of first signals following each other in timed sequence, each of which represents at least one field of a visual image signal, a rotary head drum, a first magnetic head mounted on the periphery of said head drum, means connecting said first signals providing means to said head for sampling said first signals at preselected sampling intervals of a duration equal to one of said first signals, said sampling intervals being spaced N first signal intervals apart, means for rotating said head drum at a predetermined speed during record and reproduce, guide means for guiding a magnetic tape in a path extending helically about the periphery of said head drum so that the sampled first signals are recorded on the tape in the form of tracks extending at an angle to and spaced along the length of the tape, means for moving said tape at a predetermined speed during record, N additional magnetic heads mounted on the periphery of said head drum, means for moving said tape at 1/(N + 1) times the predetermined tape speed during reproduce, said additional magnetic heads being positioned with respect to said first head so that during reproduce said additional heads rescan the same track reproduced by said first head with respective time lags of one first signal interval, and means for combining the outputs from said first head and said additional heads during reproduce, whereby a visual image signal is reproduced identical in duration to said visual image signal prior to record.

10. Apparatus in accordance with claim 9 where N is equal to one.

11. Apparatus in accordance with claim 9 wherein said first signal is equal in duration to one field of a television signal and wherein N is equal to one.

12. Apparatus in accordance with claim 9 wherein said first signal is equal in duration to one field of a television signal.

13. Apparatus for recording and reproducing a visual image signal comprising means for providing a series of first signals following each other in timed sequence, each of which represents a field of a visual image signal, a rotary head drum, magentic recording and reproducing head means mounted on the periphery of said head drum, means connecting said first signals providing means to said head for sampling said first signals at preselected sampling intervals of a duration equal to one of said first signals, means for rotating said head drum at a predetermined speed during record and reproduce, guide means for guiding a magnetic tape in a path extending helically about the periphery of said head drum so that the sampled first signals are recorded on the tape in the form of tracks extending at an angle to and spaced along the length of the tape, means for moving said tape at a predetermined speed during record, magnetic reproducing head means mounted on the periphery of said head drum, means for moving said tape at a predetermined tape speed during reproduce which is slower than the predetermined record speed, said magnetic reproducing head means being positioned with respect to said first head and said reproduce head speed being selected so that during reproduce said magnetic reproducing head means rescans the same track reproduced by said recording and reproducing head means with a time lag of one first signal interval, and means for combining the outputs from said recording and reproducing head means and said reproducing head means during reproduce, whereby a visual image signal is reproduced identical in duration to said visual image signal prior to record.

* * * * *